March 21, 1961 P. W. ALSTON 2,976,189
METHOD FOR PURIFYING SUGAR BEARING BEET DIFFUSION JUICE
Filed Dec. 12, 1955 2 Sheets-Sheet 1
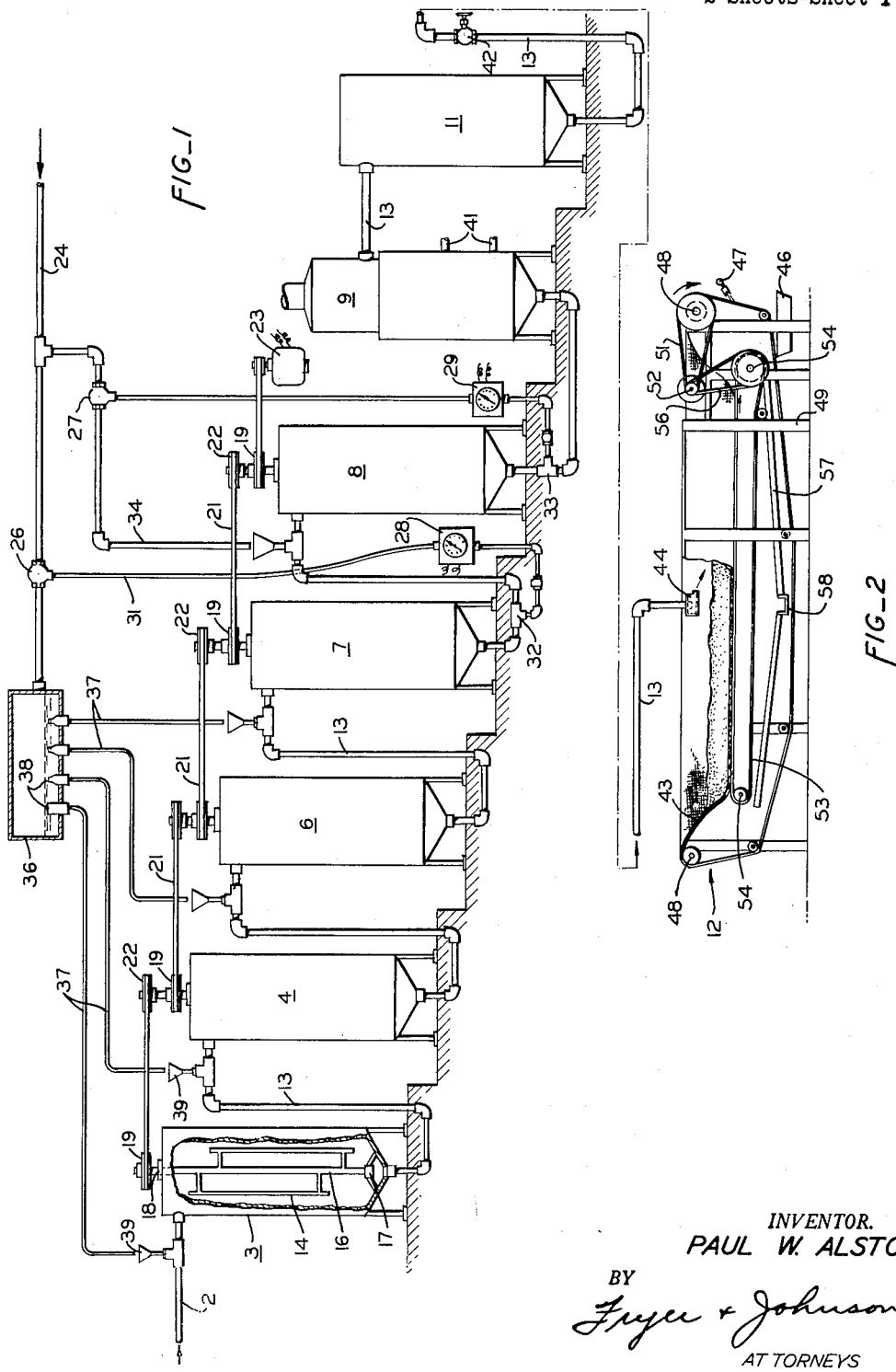
INVENTOR.
PAUL W. ALSTON
BY
Fryer & Johnson
ATTORNEYS

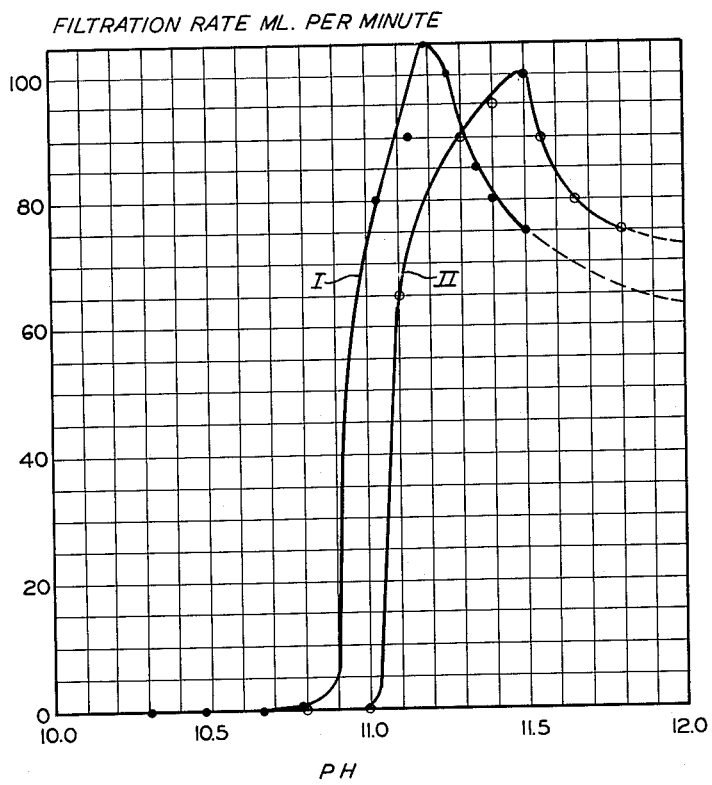

United States Patent Office 2,976,189
Patented Mar. 21, 1961

2,976,189

METHOD FOR PURIFYING SUGAR BEARING BEET DIFFUSION JUICE

Paul W. Alston, 1042 Oxford St., Berkeley, Calif.

Filed Dec. 12, 1955, Ser. No. 552,523

6 Claims. (Cl. 127—48)

This invention relates to the manufacture of sugar, and more particularly to the removal of impurities from sugar bearing juices that are obtained from sugar-containing plants.

Sugar is commonly prepared from sugar beets, by a series of steps in which the sliced beets are first extracted with hot water in a diffusion battery to provide a diffusion juice, the diffusion juice is purified, the purified juice is evaporated to form a standard liquor syrup, and sugar is crystallized from the syrup. The remaining uncrystallized material, which is called molasses, may be further treated in any well known manner, such as by the Steffen process, in order to recover additional sugar.

In this method of manufacturing sugar, dissolved and colloidal non-sugar impurities such as organic acids, amino acids, pectins and proteins are extracted from the beets by the hot water along with the sugar. Unless such impurities are removed from the diffusion juice, it is very difficult to concentrate the juice by evaporation because the impurities cause excessive scale formation and foaming. Also, it is difficult to crystallize solid sugar from sugar that is dissolved in the diffusion juice unless the juice is purified.

Purification of the sugar bearing diffusion juice is usually accomplished by precipitating impurities with an excess of lime in the form of milk of lime, carbonating the limed diffusion juice with carbon dioxide gas in order to precipitate the unreacted excess lime in the form of calcium carbonate and to adsorb additional impurities on the calcium carbonate precipitate, and finally separating the coagulated impurities and calcium carbonate precipitate from the diffusion juice by any conventional means, such as by filtration. In most diffusion juice purification systems, a total of from about 2% to 3% by weight of lime based on the weight of beets diffused is added to the diffusion juice, accompanied by at least two separate carbonations with carbon dioxide gas before the precipitated impurities and calcium carbonate are filtered.

Instead of adding all of the lime at once, a preliming process is sometimes utilized in which less than 1% of lime is added slowly in increments before the main addition of lime. This stepwise preliming procedure results in the precipitation of colloids that coagulate at low alkalinities, and reduces the tendency of such coagulated colloids to redissolve as more lime is added. However, even with preliming, the main addition of excess lime causes some of the impurities that were coagulated by the preliming to redissolve. Furthermore, regardless of the method by which the lime is added, carbonation of the limed diffusion juice before the coagulated impurities are filtered reduces the alkalinity of the diffusion juice to a pH of about 10.0, which is less alkaline than the pH of from about 10.8 to 11.6 at which the maximum amount of impurities remain in the form of a precipitate.

Although carbonation is disadvantageous in that it causes some precipitated compounds to redissolve and thus lowers the purity of the filtrate, in all conventional purification methods it has been found necessary to carbonate the limed diffusion juice before filtration of impurities precipitated by the lime in order to obtain a precipitate that can be filtered. The coarse calcium carbonate precipitate that is produced by carbonation renders the sludge of coagulated colloidal matter filterable; whereas without carbonation, the coagulated impurities precipitated by conventional liming methods form a relatively impervious cake on the filter that prevents filtration of the diffusion juice.

It has been suggested in United States Patent No. 2,477,206 that a small amount of lime in the order of from 0.1% to 0.75% by weight based on the weight of beets diffused might be added all at once to the diffusion juice followed by filtration with or without a filter aid either before or after carbonation. However, unless the lime is added in the amount and in accordance with the method of the present invention, it is still necessary to carbonate the limed diffusion juice with carbon dioxide gas in order to provide a precipitate that can be economically separated from the diffusion juice by filtration. Even with the use of expensive filter aid, filtration of diffusion juices limed by previous methods is slow and difficult.

When sugar is obtained from sugar cane, the washed cane is milled in a cane mill to form mill juice and a pulpy material called bagasse. The mill juice is conventionally purified by treatment with lime, carbonation, and successive crystallizations.

Summarizing this invention, it comprises effecting purification of the raw sugar bearing juice obtained from sugar containing plants, by adding lime to the juice while keeping the juice gently moving at a rate below that at which the precipitate of impurities formed with the lime breaks up, and continuing addition of lime until strong, somewhat granular curds of precipitated impurities are formed in a clear juice to provide a juice that is readily filterable.

For optimum precipitation of impurities and filtration of the coagulated precipitate, the lime is added stepwise in increments at spaced intervals to allow time for stabilization of the precipitate that forms at different alkalinities, and to build up a relatively strong precipitate of impurities that does not readily disintegrate. The precipitated impurities are then separated from the juice without prior carbonation, after which the filtrate may be further treated in any conventional manner.

The amount of lime required to produce a readily filterable precipitate of impurities in accordance with this invention varies with each different juice depending upon the type of plant, length of storage, and variables in the process of obtaining the juice from the plant. When lime is slowly added to the juice by the method hereof accompanied by gentle stirring that does not break up the precipitate, a fine precipitate is initially formed, followed by the appearance of large gelatinous clouds of flocculent precipitate in turbid juice, and then by smaller and more compact curds in clear juice, at which point the optimum filterability is approached. Consequently, the appearance of the precipitate and the clarity of the diffusion juice may be utilized as indicia for indicating when sufficient lime has been added to the juice to produce a readily filterable precipitate.

If the amount of lime is slightly above or below the optimum, the filtration rate of the limed juice is appreciably reduced, and the character of the precipitate is changed. Prior methods have either utilized an amount of lime below or above the amount for optimum filtration, or have employed agitation of the juice that was sufficient to cause disintegration of the curds of precipitated impurities into small particles that prevent passage of diffustion juice through a filter.

The most accurate method of determining the optimum amount of lime for addition to the juice to provide a filterable precipitate of strong curds is to measure the filtration rate of a sample of the juice after each stepwise addition of a small amount of lime. When the filtration rate reaches a maximum and begins to decrease upon further addition of lime, the amount of lime required for optimum filtration has been established.

The precipitate of impurities obtained by the method of this invention is readily filterable without carbonation, and it is composed of relatively strong curds of impurities that are not obtainable by any previous method of purification. Since the point of optimum filterability corresponds to the point at which the maximum proportion of impurities are present as a filterable precipitate, a filtrate or high purity is readily obtained upon further conventional treatment of the juice to provide a high yield of relatively pure white sugar that is readily crystallized from the concentrated filtrate. Furthermore, the total amount of lime required for purification of the juice in accordance with this invention is much smaller than the amount employed for purification by conventional means. This decrease in the amount of lime required for purification results in substantial savings when the method is utilized for treatment of the large amount of diffusion juice that is purified in a sugar refinery.

In greater detail, this invention is particularly applicable to the treatment of diffusion juice extracted from cellular, sugar containing plants, such as sugar beets. Sugar bearing diffusion juice is obtained from the beets in the usual manner by first screening and washing the beets to remove dirt, then slicing the beets into thin strips in a beet slicer, and finally extracting sugar from the beet slices with hot water. The extraction of sugar is carried out in the conventional diffusion batteries or in continuous diffusers.

Since both sugar and impurities of the character previously described are extracted from the beets by hot water, the impurities must be removed in order to effect satisfactory evaporation of the diffusion juice and crystallization of sugar. In accordance with this invention lime is added to the diffusion juice to produce a readily filterable precipitate of large curds of impurities in a clear solution, and the juice is filtered prior to carbonation.

Although the diffusion juice may be maintained at any temperature up to the boiling point during this initial addition of lime, a smaller amount of lime is required to precipitate impurities in a cool diffusion juice than is required for a warm juice. The lime forms an appreciable amount of calcium saccharate when the temperature of the juice is in excess of about 70° C., and thus all of the lime is not completely utilized for precipitation of impurities. Consequently, for reasons of economy, the initial quantity of lime for production of a filterable precipitate is desirably added to diffusion juice that is not above about 70° C. However, once the desired precipitate has been formed, the limed diffusion juice is advantageously heated in order to increase the filtration rate during separation of the precipitated impurities.

Lime employed for purification of the diffusion juice is most conveniently added in the form of milk of lime, which is a suspension of calcium hydroxide in an aqueous solution. Other forms of lime such as the calcium saccharates or saccharate milk may also be employed. In addition, equivalents of lime, namely other alkaline earth alkalis, such as barium hydroxide may be utilized, although such compounds would be unduly expensive for commercial operations.

The desired filterable precipitate of impurities is obtained by adding lime to the diffusion juice while the juice is kept in gentle motion without turbulence during formation of the precipitate, and by continuing addition of lime until a readily filterable precipitate of relatively strong curds in a clear solution is obtained. Best results are obtained with constant gentle stirring, but intermittent stirring may be employed.

During the period in which lime is added to the diffusion juice, the juice is stirred at a rate below that which causes the precipitate to break up. If the limed diffusion juice is stirred or allowed to flow at a rate that produces turbulence, the curds of precipitated impurities disintegrate into particles which block passage of the diffusion juice through the filter and render direct filtration impractical. The determination of whether or not the rate of stirring or movement of the diffusion juice is sufficiently slow to enable strong curds of precipitate to form is easily made by visual observation of the precipitate during addition of the lime. If the flocculent precipitate breaks up, the stirring rate or motion of the diffusion juice is reduced until the disintegration no longer occurs.

Stepwise addition of lime to the diffusion juice in increments at spaced intervals, accompanied by gentle stirring is desirable for best results in forming a readily filterable precipitate. Although a filterable precipitate may be obtained by fairly rapid addition of the major proportion of the lime followed by slow addition of lime up to the amount desired, the filter tends to become blocked and the rate of filtration is substantially reduced compared to a precipitate formed by lime added in increments. Consequently, the lime is advantageously added in at least two or three steps, accompanied by an interval at least a minute before further addition of lime, in order to allow the precipitate to become stabilized. However, the continuous addition of lime at a very slow rate over an extended period produces results equivalent to actual stepwise addition of lime, and may be employed. Consequently, wherever stepwise addition of lime is referred to, it is also meant to include such slow continuous addition.

Since the character of the diffusion juice varies because of differences in the type and treatment of the beets and because of variables in the diffusion process, a particular numerical amount of lime that will produce a satisfactory rate of filtration for all diffusion juices will not usually be the same for all such juices but can be readily ascertained by simple tests. For example, when lime is added to the diffusion juice in increments with gentle stirring in accordance with this invention, visual observation of the precipitate and the diffusion juice indicate when sufficient lime has been added. As lime is added to the diffusion juice, a fine precipitate is initially formed, followed by the appearance of large flocculent clouds of gelatinous precipitate in a turbid liquid, and then by smaller and more solid curds in a substantially clear liquid when sufficient lime has been added to provide a precipitate that is readily filtered. Further addition of lime before filtration of the precipitate only reduces the rate at which the precipitated impurities can be filtered from the diffusion juice.

The diffusion juice is considered clear for purposes of determining filterability by visual inspection even though the liquid is colored, provided that it is not substantially turbid. The large flocculent precipitate that occurs in a turbid solution just prior to the formation of the readily filterable precipitate is usually primarily composed of particles larger than about ¼ inch in diameter. When the optimum amount of lime has been added, the precipitate changes into relatively granular curds less than about $\frac{1}{16}$ inch in diameter suspended in clear diffusion juice.

The most accurate means of determining the amount of lime required for formation of a precipitate that provides an optimum rate of filtration, is to add lime in small increments to a sample of the diffusion juice with gentle stirring, and measure the rate of filtration of a portion of the sample after each addition of lime. Since the optimum lime addition is generally not approached until the solution begins to clear and the large gelatinous precipitate begins to change into granular curds, it is usually not necessary to commence measurements of the filtration rate before such time. The filtration rate increases rapidly with very small additions of lime as the amount of lime approaches the quantity that provides a maximum rate of filtration. After the optimum amount of lime has been added, further addition of lime results in a marked decrease in the rate of filtration of the diffusion juice. Consequently, the desired quantity of lime for best filtration of any particular diffusion juice is readily determined from a comparison of filtration rates obtained with increasing amounts of lime, and by employing the amount that provides a maximum rate of filtration.

For example, a suitable method of determing the proportional amount of lime required to produce a precipitate that is readily filterable is to place a sample of about 1500 ml. of the diffusion juice in a two liter beaker, and add small increments of about 0.05 percent by weight CaO based on the weight of beets diffused, while stirring gently. The additions of lime are spaced about two minutes apart to permit the precipitate to stabilize. When a heavy voluminous precipitate has formed, the clarity of the supernatant diffusion juice is observed after a wait of about three minutes. If the juice is still turbid, additions of lime are continued in smaller increments of about 0.01 percent of CaO based on the weight of juice diffused. As soon as the diffusion juice commences to become clear, and the large flocculent precipitate begins changing into a smaller more granular form, filtration tests are commenced.

The filtration tests are readily conducted by transferring about 300 ml. of the limed diffusion juice from a beaker to a stemless funnel fitted with a filter that provides rapid filtration and a clear filtrate. The type of filter employed in beet tare laboratories, such as the creped long fibered filter papers sold by Reeve-Angel under the trademark Reeve-Angel Nos. 201, 202 or 226 are examples of suitable filter papers. The volume of juice filtered in any selected period of time, such as one minute, is determined after each addition of a small increment of lime until further lime addition results in a lowering of the filtration rate. Generally, any rate of filtration faster than 80 ml. per minute with a 4 inch diameter funnel and Reeve-Angel filter paper No. 226 indicates that a readily filterable precipitate has been obtained.

The amount of lime added to the diffusion juice may be measured in terms of the percent by weight of lime based upon the weight of beets diffused, which is a measure commonly employed in the sugar industry, or by means of the conventional pH of the limed diffusion juice. Because of reactions of lime at various concentrations with impurities in the diffusion juice, the pH does not increase in proportion to the amount of lime with each addition of lime. Nevertheless, the pH of the limed diffusion juice provides a measure of the lime concentration that may be duplicated as long as a consistent method of determining the pH is employed, and the pH is most conveniently utilized for controlling the quantity of lime added to diffusion juice in a continuous automatic liming apparatus. The pH of the limed diffusion juice may readily be determined by a pH meter, such as a glass-calomel electrode.

Periodic determinations of the optimum amount of lime required for optimum filtration of the limed juice are regularly made whenever any conditions of extraction are varied. With most beet diffusion juices, the optimum amount of lime for best filtration is at a pH somewhere between 10.8 and 11.6, or between 0.20 and 0.60 percent by weight CaO based on the weight of beets diffused.

After the optimum amount of lime has been added to the diffusion juice, the juice is preferably heated to increase the rate of filtration. Any temperature below the boiling point of the diffusion juice may be employed, but a temperature of between 70° C. to 90° C. is usually preferred, since it provides optimum filtration without unduly increasing the color of the diffusion juice. As previously explained, the juice is desirably heated after the lime has been added rather than prior to addition of lime in order to reduce the amount of lime required for provision of a readily filterable precipitate.

The limed diffusion juice is then separated from the precipitate in any conventional manner. A filter that subjects the flocculated curds of precipitate to a minimum amount of pressure during filtration is preferred so that the precipitate is not compressed into a relatively non-porous cake that prevents filtration. Although any filter that operates under a low head of liquid pressure may be employed, a preferred form of filter is disclosed in detail in applicant's co-pending application for "Filtration Apparatus and Method," Serial No. 552,549, filed December 12, 1955. Although decantation may be used to separate the juice from the curds of precipitated impurities, it is a slow and inefficient process since the precipitate settles very slowly.

The filtrate from the filtered, limed diffusion juice produced in accordance with this invention is advantageously further purified in any conventional manner in order to remove additional impurities. Further purification is most economically accomplished by adding additional lime to the filtrate of the diffusion juice, subjecting the limed filtrate from the diffusion juice to carbon dioxide gas in order to precipitate additional impurities, and separating the limed diffusion juice filtrate from the precipitate formed by the additional lime and the carbon dioxide gas. However, other methods of further purification, such as conventional ion exchange resins, may be employed.

One method by which the filtrate may be further purified is the well known double carbonation system, which is the method of purifying diffusion juice most commonly employed in the United States. In the double carbonation system, the diffusion juice is limed with from 2 to 3 percent lime, and the limed diffusion juice is carbonated by introductiton of carbon dioxide gas at the bottom of a first carbonation tank until the gelatinous precipitate "breaks" and becomes granular. The diffusion juice next overflows from the first carbonation tank to the thickener where most of the precipitated impurities are separated. Clear liquid overflowing from the thickener is then transferred to the second carbonation tank where it is carbonated with carbon dioxide gas at elevated temperatures to precipitate the remainder of the dissolved calcium, and to remove color as well as additional impurities. After the second carbonation, the diffusion juice is filtered in a pressure filter to separate the precipitated impurities from the purified juice.

When the conventional double carbonation system is employed to further purify a diffusion juice that has first been limed and filtered in accordance with this invention, only about one-half as much lime is required as is usually needed for the purification of untreated raw diffusion juice by double carbonation, and the purity is not increased by employing a large amount of additional lime. Consequently, an additional amount of lime less than 1.5 percent by weight CaO based on the weight of beets diffused is preferred for additional purification.

Furthermore, the extent of the first carbonation of the limed and filtered diffusion juice hereof required to cause the gelatinous precipitate to change and form a heavy granular precipitate is appreciably reduced, and the settling rate of the precipitate is so high that only a portion of the usual settling area is required.

Purification of a diffusion juice by initial liming and filtration in accordance with this invention followed by conventional double carbonation produces a diffusion juice of substantially higher purity than is obtained by the use of the double carbonation system alone. As a result, the yield of granulated sugar is increased by from 2 to 4 percent with this method. Furthermore, this higher purity is obtained along with appreciable savings in the amount of lime required for purification.

Another method treating the previously limed and filtered diffusion juice in order to increase its purity is to add from about one-fourth to one-half percent by weight CaO based on the weight of beets diffused to the filtrate of the diffusion juice, and then carbonate the diffusion juice at the second carbonation station of the conventional double carbonation system without use of the first carbonation station. After the diffusion juice has been carbonated at the second carbonation station, it is filtered in the usual manner employed in the double carbonation. A substantial reduction in the total amount of lime employed for purification is obtained by this method, but the purity of the treated diffusion juice is not appreciably increased over the purity obtained in the conventional double carbonation of untreated diffusion juice. This method is particularly useful in plants that employ ion exchange resins for final purification of the juice.

Sugar is obtained from the purified diffusion juice in the customary manner by subjecting the filtrate to a small amount of sulfur dioxide to inhibit discoloration of the solution during evaporation. The juice is then filtered, heated, and sent into evaporators. Evaporation of the juice is continued until the percent solids increases from about 10 to 15 percent by weight of the filtered diffusion juice, up to between 50 and 65 percent by weight of concentrated thick juice. A syrup-like fluid known as standard liquor is then formed by mixing the thick juice with sugar from after boilings. The standard liquor is then boiled under a vacuum until it becomes supersaturated with sugar, and sugar is finally crystallized from the supersaturated liquor by introducing a small amount of powdered sugar to provide a nucleus for crystallization.

As a practical way of conducting the method of this invention, reference is now made to the drawings in which:

Fig. 1 is a more or less schematic side elevational view of apparatus for continuous purification of diffusion juices in accordance with this invention with parts broken away for purposes of clarification.

Fig. 2 is a schematic elevational view of the preferred type of filter connected with the apparatus of Fig. 1.

Fig. 3 is a graph illustrating the change in filtration rate for two different diffusion juices as the alkalinity is increased by addition of lime, the alkalinity being expressed in terms of pH. The curves vividly illustrate the desirability of adding an optimum amount of lime in order to obtain a maximum rate of filtration. The data for the curve marked I was obtained by the procedure described in Example 1, and the data for the curve labeled II was obtained in accordance with the method described in Example 2.

With reference to Fig. 1, the unpurified raw diffusion juice obtained from the usual diffusion apparatus, not shown, flows into the liming apparatus through conduit 2 at the flow rate produced by the diffuser. The diffusion juice proceeds into initial liming tank 3 of the liming apparatus hereof, and then flows successively through open liming tanks 4, 6, 7, and 8, into heating tank 9, filter supply tank 11, and finally to filter 12.

The flowing diffusion juice passes from one tank to the next from left to right in the drawing through conduits 13, which are located so that the entrance of the diffusion juice into each successive tank is lower than the point of entrance of juice into the preceding tank. In this manner the diffusion juice flows by gravity rather than by mechanical pumping into each succeeding unit so that the curds of precipitated impurities are not broken up by a pump. Although gentle pumping can be employed to pass the diffusion juice through the liming apparatus provided that the pump does not break up the precipitate, a slow, streamline gravity flow produced by the difference in level of diffusion juice in successive tanks is preferred for obtaining a precipitate of impurities that is most readily filtered.

The flow of diffusion juice in liming tanks 3, 4, 6, 7 and 8 enters at the top of a tank, flows out of the bottom part of each tank, and proceeds to the top of the following tank by means of the conduits 13 which connect the bottom of each of such liming tanks to the top of the following lower tank. This arrangement is preferred since it permits the precipitate to move slowly towards the bottom of the tank along with the current of diffusion juice.

However, in heating tank 9, the limed diffusion juice flows from liming tank 8 through conduit 13 to the bottom of tank 9 and out of the top of the tank in the preferred embodiment of the apparatus. Tank 9 is a vertical single pass juice heater in which the juice flows upwards through a multiplicity of tubes at a low velocity. The tubes are surrounded by steam which heats the juice as it rises up through the tubes. This type of heater is preferred over a high speed juice heater that employs pumps to force the juice; since the action of the pumps tends to break up the precipitate and render filtration difficult. The flow of juice is then conducted through conduits 13 from heating tank 9 to the top of filter supply tank 11.

Each of the liming tanks 3, 4, 6, 7 and 8 contain paddles 14 disposed on rotating shaft 16 as shown in the part of tank 3 broken away. The paddles are slowly rotated during operation of the apparatus in order to keep the diffusion juice in slow circular movement. The shafts 16 are mounted at the bottom of each tank on support bearing 17 and at the top of the tank by guide bearing 18. Each shaft 16 extends from the top of the tank, and it has a pulley 19 mounted on the top portion which rotates the shaft by means of drive belts 21. Tanks 4, 6, 7, and 8 each have a drive pulley 22 on shaft 16 which is connected to the driven pulley 19 of an adjacent tank by belt 21. Drive pulley 22 and pulley 19 are in each case the same diameter, and by this arrangement each of the shafts 16 is driven by motor 23 at the same rate of speed as the other shafts 16.

Lime is distributed to the flowing diffusion juice through conduit 24 from a lime supply tank, not shown, and the total amount of lime added to the diffusion juice is regulated by electrically operated valves 26 and 27 which are respectively controlled by pH meter-controllers 28 and 29 through insulated wiring 31. The major proportion of added lime is distributed to tanks 3, 4, 6 and 7, and this amount is controlled by means of conventional pH meter-controller 28 which is connected at 32 to conduit 13 at the bottom of tank 7, in order to measure the pH of the diffusion juice as it flows out of tank 7. The pH meter-controller 28 and 29 operate in the conventional manner by actuating a small motor, not shown, in valves 26 and 27 with amplified current from the meter-controller whenever the pH varies from the setting. An arm on such motor controls the valve, which in turn regulates the amount of lime passing into the liming tanks.

The pH meter-controller 28 is preferably set to regulate a flow of lime through valve 26 that will provide a pH of the diffusion juice as it leaves tank 7 that is slightly below the optimum pH for best filtration. For example, a setting to a pH 0.2 below the pH for optimum filtration is suitable. The final small addition of lime to bring the pH of the diffusion juice up to the desired point for best filtration of precipitated impurities is regulated by setting the predetermined desired pH on pH meter-controller 29, which is connected to conduit 13 at 33 adjacent the bottom of tank 8. In this manner pH meter-controller measures the pH of the diffusion juice after all the lime has been added, and governs the lime added to the diffusion juice through conduit 34 just before the juice passes into the final liming tank. This last small addition of lime by means of separate pH meter-controller 29 and valve 27 is preferred in order to obtain close control of the pH, but it is not essential.

Lime that enters the diffusion juice as the juice passes into liming tanks 3, 4, 6 and 7, is conducted through conduit 24 and then into multiport manifold 36. Distribution of the lime from multiport manifold 36 to the liming tanks is effected by conduits 37 connected in each case to the conduits 13 which carry the diffusion juice, just prior to the point at which the diffusion juice enters the upper part of the tanks.

Ports 38 in the manifold 36, which govern the distribution of lime into the various conduits 37, are preferably of different size, with the largest port directing lime to the initial liming tank 3, and the size of the ports decreasing for each successive tank. By this arrangement, the largest addition of lime to the flowing diffusion juice occurs just as the juice enters tank 3, and the amount of lime added to the diffusion juice entering each successive tank is less than the amount entering the preceding tank.

A gradually decreasing stepwise addition of lime is preferred since it enables the precipitate of impurities to form and become stabilized before the next addition of lime, and the succeeding smaller additions of lime do not destroy the precipitate formed at lower alkalinities. A suitable ratio of areas of the openings for ports 38 is $5/12$ of the total for the port that distributes lime to the initial tank 3, $4/12$ for the port for tank 4, $2/12$ for tank 6, and $1/12$ for tank 7. The total lime flowing into manifold 36 is then distributed to the liming tanks in such ratios. Conduits 37 and 34 conducting lime to the individual tanks 3, 4, 6, 7 and 8 are spaced from the funnels 39 to enable the flow of lime into the flowing diffusion juice to be observed by the operator of the apparatus to be certain that the viscous milk of lime does not block the conduits 37 and 34.

After the lime has all been added, the limed juice flows into the bottom of heating tank 9, which is heated by steam circulated into the tank through conduits 41 from a suitable source of steam, not shown, to provide faster filtration of the limed juice, and which tank 9 is vented to permit gas released by the heating of the juice to escape. The juice flows up through tubes, not shown, that are surrounded by steam in the heating compartment of tank 9, and into the top of filter supply tank 11 from where it descends to the bottom of the tank 11 and into filter 12. Hand operated valve 42 provides a control of the flow rate of limed juice passing into the filter 12.

Precipitated impurities are removed from the diffusion juice by the filter 12, which is shown schematically in Fig. 2 as a continuously moving fabric filter belt 43 that constantly discharges precipitate as the belt rotates. This type of filter is more completely disclosed and claimed in the aforementioned co-pending application. However, any type of filter conventionally employed for filtration of soft fragile precipitates may be utilized for filtering the curds of precipitated impurities in accordance with this invention. A filter that operates under a low head of the liquid being filtered is preferred in order to avoid compression of the precipitate into a cake that prevents passage of liquid through the filter medium.

The juice is dispensed to the filter through weir pan 44 which is placed in the basin formed by the filter belt 43 in order to obviate breakage of the curds of precipitated impurities as the juice enters the filter. The filter belt 43 moves in the direction of the arrow in the drawing and deposits the precipitate in precipitate collecting trough 46. A water or dilute juice spray from nozzles 47 aids in removal of the precipitate clinging to the filter belt when the belt passes downward past trough 46.

The filter belt is carried by rotating shafts 48 supported on body frame 49, and the head drive shaft 48 for the filter belt is rotated by chain drive 51 attached to electric motor 52.

Steel wire open mesh support belt 53 is employed to support the upper portion of filter belt 43 in order to prevent undue strain on the filter belt caused by the weight of the juice. Support belt 53 is moved on rotating head and tail shafts 54 by motor 55 through drive chain 56 at the same linear speed as the filter cloth 43. The filtrate from the limed juice passes through the filter belt 43 past support belt 53, and into filtrate collecting tray 57 below the support belt. Due to the inclination of collecting tray 57, the filtrate flows into trough 58 from where it flows into a tank, not shown, for further treatment, as previously described.

In operation of the apparatus, the initial addition of lime passes through multiport manifold 36 and conduits 37 and enters the flowing juice just before the juice enters a liming tank. The juice is slowly circulated in the tanks by paddles 14 which are moved at a rate that does not break up the precipitate. Each portion of diffusion juice descends spirally through a tank in a separate strata. For example, in a tank of 50 gallons capacity, paddle arms 14, which are 2 inches wide, are rotated at about 10 revolutions per minute to provide a suitable rate of stirring. A slow streamline flow is maintained in pipes 13 so that turbulence caused by friction will not result in disintegration of the precipitate, and this rate of flow is maintained by means of a small head between successive tanks, due to the difference in outlet level of the tanks.

A residence time of any particular portion of the flowing juice in each tank of three to five minutes is desirable in order to permit the precipitate of impurities to become stabilized before further addition of lime. As the juice enters each successive liming tank, lime is added to the juice. The total amount of lime entering tanks 3, 4, 6 and 7 is controlled by pH meter-controller 28, and the distribution of lime added to juice entering tanks 3, 4, 6 and 7 is governed by the relative areas of the ports in multiport manifold 36. The pH meter-controller 28 is advantageously set to bring the alkalinity of the diffusion juice to a pH about 0.2 below the optimum for maximum filtration. The final addition of lime to bring the pH of the juice to the desired point is governed by pH meter-controller 29.

After all of the lime has been added, the juice carrying the curds of precipitated impurities flows to heating tank 9 where it is heated in order to increase the rate of filtration. The juice then proceeds to filter supply tank 11, and finally to filter 12 where the juice is filtered. The precipitated impurities are continuously removed by the rotating filter belt 43, and the purified sugar bearing filter is collected in trough 58. Further recovery of sugar remaining in the precipitate increases the total amount of sugar obtained.

This invention is also useful in purifying mill juice obtained by grinding sugar cane in the conventional cane mill. The mill juice contains soil and it is difficult to see the character of the precipitate of impurities that is formed when lime is added to the juice. Consequently, a sample of the cane mill juice is filtered to remove the soil by any conventional means, such as by passing the juice through a bed of sand. The lime is added to the clarified juice in increments at spaced intervals with slow stirring in the same manner as for the beet diffusion juice. When sufficient lime has been added to obtain a readily filterable precipitate of impurities, as determined by successive filtration tests or by visual observation of the change from a flocculent precipitate in a turbid juice to somewhat smaller and more compact curds in a clear juice in accordance with the procedure previously specified herein for beet diffusion juices, the desired amount of lime addition has been established. Lime is added to the main body of mill juice on the basis of such determination, as conveniently measured by the pH of the juice.

With mill juice from sugar cane, the lime is preferably added at room temperature, and then the mill juice is filtered in the same manner as previously described for limed beet juice. The slurry of precipitate and limed juice may be heated to increase the rate of filtration, but with a cane juice the temperature is preferably maintained below 60° C. in order to avoid unfavorable reactions of lime with reducing sugar. The filtered juice is further purified by carbonation to a pH of about 7.0 to precipitate excess lime and additional impurities, and such impurities are conveniently removed in the conventional manner by filtration with a rotary or pressure filter. The filtrate is then evaporated and crystallized to produce sugar.

The following are typical examples of the purification of sugar bearing juices in accordance with this invention. In all the following examples, the soluble solids in the juice is expressed in Brix as measured on the conventional Brix hydrometer scale; the color is expressed in terms of the percent absorbency as determined by the method of Morse and McGinnis reported in Industrial and Engineering Chemistry, Analytical Edition, volume 14 (1942), page 212; and the purity is the apparent purity in percent based on the ratio of sucrose, measured by polarization, to the soluble solids of the juice as measured on the Brix hydrometer scale.

*Example 1*

A diffusion juice from a continuous diffuser in a beet sugar processing plant which had the following properties was purified in accordance with this invention:

Soluble solids_____ 84.1%.
Purity_____ 6.7.
pH_____ 14.5° Brix.

The amount of lime required for producing a precipitate of large readily filterable curds in a clear solution was first determined by adding milk of lime in increments of 0.02 percent by weight CaO based on the weight of beets diffused. The milk of lime, which contained 15 percent by weight calcium oxide dispersed in water, was added to a 3 gallon sample of the diffusion juice contained in a four gallon bucket. The diffusion juice was kept in motion by gentle stirring with a hand held paddle at a rate that did not produce turbulence or cause the precipitate to break up. After each addition of lime, the stirring was continued for two minutes to permit the precipitate to stabilize.

When the precipitate had stabilized, the filtration rate was determined using a 4 inch diameter glass ribbed stemless funnel fitted with Reeve-Angel No. 226 filter paper. The level of diffusion juice was maintained at the top of the funnel during the filtration tests, and the average temperature of the juice was about 45° C. The effects of adding increments of 0.02 percent lime on the pH, on the filtration rate in ml. per minute, and on the character of the precipitate are specified in the following table. The curve of the filtration rate with increasing pH is plotted in Fig. 3 and it is identified as 1. This curve graphically illustrates the importance of adding the optimum amount of lime to the diffusion juice in order to obtain a maximum rate of filtration.

| pH | Filtration Rate, ml./min. | Character of Precipitate | Total CaO |
|---|---|---|---|
| 7.30 | None | No apparent precipitate | 0.02 |
| 7.9 | do | do | 0.04 |
| 8.30 | do | do | 0.06 |
| 8.60 | do | Light grey precipitate | 0.08 |
| 9.00 | do | Fine grey gelatinous precipitate | 0.10 |
| 9.20 | do | No change | 0.12 |
| 9.42 | do | Slightly darker gelatinous precipitate. | 0.14 |
| 9.70 | do | No apparent change | 0.16 |
| 9.92 | do | do | 0.18 |
| 10.30 | do | Slightly darker precipitate | 0.20 |
| 10.48 | do | Heavy fine dark precipitate | 0.22 |
| 10.63 | do | No apparent change | 0.24 |
| 10.78 | Dropwise (Too slow to measure). | Darker precipitate in turbid supernatant liquid. | 0.26 |
| 10.78 | Slow | Large heavy flocculent precipitate in turbid supernatant liquid. | 0.28 |
| 11.00 | Dropwise | Large heavy flocculent precipitate in less turbid supernatant liquid. | 0.30 |
| 11.02 | 80 | Small granular curds in clear supernatant liquid. | 0.32 |
| 11.12 | 90 | Finer dark grey curds that settle slowly in clear yellow-greenish filtrate. | 0.34 |
| 11.18 | 105 | No change | 0.36 |
| 11.26 | 100 | Lighter grey granular precipitate in clear yellow supernatant liquid. | 0.38 |
| 11.35 | 85 | Precipitate becoming gelatinous | 0.40 |
| 11.40 | 80 | No change | 0.42 |
| 11.50 | 75 | Lighter, finer, more gelatinous precipitate. | 0.44 |

To illustrate the effect of temperature on the filtration rate, the diffusion juice containing the precipitate provided by 0.44 percent by weight CaO based on the weight of beets diffused was heated, and the filtration rate was determined at rising temperatures. At 55° C. the rate of filtration was 95 ml. per minute, at 75° C. The rate was 125 ml. per minute, and the rate increased to 150 ml. per minute at 100° C. The advantageous increase in rate of filtration obtained by heating the diffusion juice is readily apparent.

After the optimum amount of lime for producing a readily filterable precipitate had been determined, the diffusion juice of the character tested flowing from the conventional continuous diffuser was purified in apparatus of the type illustrated in Fig. 1. Liming tanks 50 gallons in size were fitted with paddle stirrers 2 inches wide, and the paddles were rotated at the rate of 10 revolutions per minute. A rate of flow of diffusion juice through the apparatus of 3 gallons per minute was maintained.

The first pH meter-controller which regulates the total amount of lime added to juice entering the first four liming tanks was set for a pH of 11.0, and the second pH meter-controller was set for a pH of 11.2 to regulate the final addition of lime. A pH meter-controller of the type sold by Minneapolis Honeywell under the trademark "Electronics" was employed.

The relative areas of ports in the miltiport manifold, which governs the ratio of lime distributed to the juice entering the first four liming tanks, was 5/12 for the initial liming tank; and 4/12, 2/12 and 1/12 respectively for the following liming tanks.

The limed diffusion juice was heated in the heating tank to a temperature of 80° C., after which it was filtered on a filter of the type illustrated in Fig. 2 which utilizes a continuously rotating filter cloth. A cotton filter cloth with a plain weave weighing 12.6 ounces per square yard, and a strand count of 26 x 20 was employed, and a filtration rate of about 0.60 gallon per minute for each square foot of wetted filter cloth was obtained.

The resultant filtrate, which had been purified in accordance with this invention, was then further purified in a conventional double carbonation system by means of a pilot commercial continuous carbonator. The usual double carbonation system procedure was followed. However, only 0.90 percent by weight CaO based on the weight of beets diffused was added to the juice before the carbonation, rather than the usual 2.5 percent by weight CaO. Also, the first carbonation was conducted to a titratable alkalinity of 0.100 gm. of CaO per 100 ml. of juice, instead of to the alkalinity of 0.080 required with the usual double carbonation purification of the same previously untreated diffusion juice.

The resultant filtered and purified juice was analyzed, and it had the following characteristics:

Color _____ 0.45
Purity _____ percent__ 93.5

The purified diffusion juice was then concentrated, and sugar was crystallized from the concentrated juice in the conventional manner.

*Example 2*

A diffusion juice having the following properties was purified by the method of this invention:

Soluble solids _____ 14.7° Brix.
Purity _____ 85.6%.
pH _____ 6.5.

In order to determine the amount of lime required to produce a readily filterable precipitate, milk of lime was added to 50 gallons of diffusion juice contained in a metal drum until the filtration rate was 100 ml. per minute. Further addition of lime was made to a 1500 ml. sample of the juice removed from the metal drum so the diffusion juice in the metal drum could be filtered at a pH that provides a rapid rate of filtration. Filtration rates were determined in the same manner and with the same funnel and type of filter paper employed in Example 1. Milk of lime containing 7½ percent by weight CaO was employed. The lime was added to the diffusion juice while the juice was gently stirred with a hand operated stirring paddle at a rate below that which caused disintegration of the precipitate.

The effect on the filtration rate of adding lime to the diffusion juice in increments at spaced intervals two minutes apart is specified in the following table. The curve of filtration rate in ml. per minute with increasing pH is plotted in Fig. 3 and identified as curve II.

| pH | Filtration Rate, ml./min. | Character of Precipitate | Total Milk of Lime (qts.) |
|---|---|---|---|
| 10.8 | None | Grey, Fine precipitate in turbid liquid. | 7 |
| 11.0 | None | Dark, large flocculent precipitate in turbid liquid. | 7¼ |
| 11.1 | 65 | Large curds in clear liquid | 7½ |
| 11.2 | 85 | ___do___ | 7¾ |
| 11.3 | 90 | ___do___ | 8 |
| 11.4 | 95 | ___do___ | 8¼ |
| 11.5 | 100 | ___do___ | 8½ |
| 11.55 | 90 | ___do___ | (1) |
| 11.65 | 80 | ___do___ | (1) |
| 11.80 | 75 | ___do___ | (1) |

[1] The quantity of lime added to the 1500 ml. portion diffusion juice obtained from the metal drum after a filtration rate of 100 ml. per minute was obtained was measured only in terms of pH. The optimum pH of 11.5 that provided the maximum filtration rate, corresponded to 0.33 percent by weight CaO based upon the weight of beets diffused.

The fifty gallons of limed diffusion at a pH of 11.5, less the small amounts of juice removed for filtration tests, was then heated to 80° C. by means of steam circulated in a copper coil wound within the metal drum. Next, the heated diffusion juice was filtered in a filter with a moving filter cloth, as described in Example 1, in order to separate the precipitated impurities. A filtration rate of about 0.66 gallon per minute for each square foot of wetted filter cloth was obtained.

The filtrate was then processed by the double carbonation method of a commercial beet sugar processing plant except that 1.00 percent by weight CaO based upon the weight of beets diffused was added before carbonation instead of the usual 2.62 percent by weight CaO employed by the same factory for purifying the same diffusion juice by the conventional double carbonation system alone.

A comparison of the properties of the juice purified this invention as described above, and by double carbonation without prior purification is given in the following table with the lime salts expressed in terms of percent by weight lime salts in the total solids.

| | Conventional Double Carbonation | The Method of This Invention followed by Double Carbonation |
|---|---|---|
| | Percent | Percent |
| Purity | 88.5 | 89.6 |
| Lime salts (Percent by weight of total solids) | 0.040 | 0.030 |
| Total CaO employed in terms of percent by weight of beets diffused | 2.62 | 1.33 |

*Example 3*

A diffusion juice of the following properties was purified:

Soluble solids _____ 13.4° Brix.
Purity _____ 86.5%.
pH _____ 6.2.

As a control the raw diffusion juice without prior processing was purified in the pilot carbonation plant of a beet sugar processing factory operating on the conventional Dorr continuous carbonation system. The same purification is obtained with the pilot plant as in the main factory on a larger scale. Ten gallons of the diffusion juice were purified using 2.5 percent by weight CaO based on the weight of beets diffused. The first carbonation was continued at 85° C. until a titratable alkalinity with 28 N acid to a phenolthalein end point of 0.80 was obtained. The alkalinity is expressed in terms of grams of CaO in 100 ml. of filtered juice, which is a measure commonly used in the industry. Second carbonation was conducted at 85° C. to an alkalinity of 0.005 gram CaO in 100 ml. of filtered juice. The filtered second carbonation juice was analyzed and the properties of the purified juice are stated in the table at the end of the example under the heading "Control."

Fifty gallons of the same untreated diffusion juice was then purified by the method of this invention. Milk of lime containing 10 percent by weight CaO was added to the juice contained in a metal tank in increments of one quart of lime at intervals of two minutes. The juice was slowly stirred by hand with a wooden paddle during addition of lime. The temperature of the juice was about 60° C. When a pH of 10.5 was obtained, the addition of lime to the fifty gallons of diffusion juice was reduced to half a quart at a time, and filtration tests were conducted on portions of diffusion juice in the manner described in Example 1. The amount of lime required to provide a test filtration rate of 80 ml. per minute with the four inch funnel and Reeve-Angel filter paper No. 226 was 0.25 percent by weight CaO based on the weight of beets diffused. The fifty gallons of limed diffusion juice was then filtered on the type of filter shown in the drawings and described in Example 1, and a filtration rate of 0.50 gallons per minute for each foot of filter cloth wetted was obtained.

The resultant filtrate was then divided into three portions.

Portion No. 1 was collected in a four liter metal beaker, heated and maintained at 85° C. by means of a heating mantle, and carbonated by introducing carbon dioxide into the bottom of the beaker until a titratable alkalinity of 0.004 gram CaO in 100 ml. of diffusion juice was obtained. The carbonated juice was then filtered and the filtrate analyzed for comparison with the other portions.

Portion No. 2 was collected and treated in the same manner as portion No. 1 except that 0.25 percent CaO based on the weight of beets diffused was added to this portion before carbonation.

Portion No. 3 of the filtrate was treated on the pilot Dorr continuous carbonator, employing double carbonation in the same manner and to the same extent as the first ten gallon portion of the original raw diffusion juice. However, 1.00 percent CaO based on the weight of beets diffused was added prior to the first carbonation. Since the lime used for the defecation was 0.25 percent, the total lime used on this third portion amounted to 1.25 percent by weight CaO based on the weight of beets diffused.

Comparative analyses of the control purification and the three portions purified in accordance with this invention are shown in the following table:

|  | Control | Portion 1 Filtrate | Portion 2 Filtrate | Portion 3 Filtrate |
|---|---|---|---|---|
| Soluble solids in the purified juice in Brix, ° | 12.9 | 13.2 | 12.4 | 12.0 |
| Lime salts (percent by weight of total solids) | 0.085 | 0.353 | 0.350 | 0.024 |
| Color | 0.810 | 1.097 | 0.833 | 0.449 |
| Purity, percent | 91.47 | 87.87 | 91.77 | 93.44 |
| Total CaO, percent | 2.50 | 0.25 | 0.50 | 1.25 |

This table clearly illustrates the savings in lime and increase in purity that is provided by the method of this invention.

I claim:

1. The method of removing impurities from an aqueous sugar bearing beet diffusion juice obtained by the treatment of beets with hot water substantially free of added $SO_2$ and at a temperature sufficient to inhibit micro-biological action and to kill living matter in the beet cells which comprises adding as a precipitant only lime to said juice in increments at intervals of at least one minute until between about 0.2 and 0.6 percent by weight CaO has been added based on the weight of beets diffused, and a precipitate of curds of impurities is formed in a clear diffusion juice, gently stirring said diffusion juice during formation of said precipitate at a rate below that at which the precipitate breaks up, heating said diffusion juice to a temperature less than the boiling point of said diffusion juice, filtering said diffusion juice in order to separate the precipitated impurities from the diffusion juice prior to substantial introduction of carbon dioxide into said juice, then subjecting the filtrate from the filtered diffusion juice to an additional precipitant of carbon dioxide gas to precipitate additional impurities, and separating the diffusion juice from the precipitate formed upon subjecting the filtrate to carbon dioxide gas.

2. The method of removing impurities from an aqueous sugar bearing beet diffusion juice obtained by the treatment of beets with hot water substantially free of added $SO_2$ and at a temperature sufficient to inhibit micro-biological action and to kill living matter in the beet cells which comprises adding lime to said juice in increments at intervals of at least one minute to form a precipitate of impurities, stirring said diffusion juice during formation of said precipitate at a rate below that at which the precipitate breaks up because of turbulence, continuing the addition of lime until between about 0.2 and 0.6 percent by weight CaO has been added based on the weight of beets diffused, and a large flocculent precipitate formed in cloudy juice is transformed into smaller more granular curds or precipitated impurities in clear juice to provide a readily filterable precipitate in the diffusion juice, stopping further addition of lime to said diffusion juice prior to substantial introduction of carbon dioxide into said juice, filtering said diffusion juice in order to separate the precipitated impurities from the diffusion juice and provide a filtrate free from precipitated impurities, adding additional lime to the filtrate from the filtered diffusion juice, subjecting the limed filtrate from the diffusion juice to carbon dioxide gas to precipitate additional impurities, and separating the diffusion juice from the precipitate formed by the additional lime and the carbon dioxide gas.

3. In the purification of an aqueous sugar bearing juice obtained by the diffusion of sugar beets with hot water substantially free of added $SO_2$ and at a temperature sufficient to inhibit micro-biological action and to kill living matter in the beet cells, the method of purifying the diffusion juice with lime and carbon dioxide gas in order to obtain a juice of high purity with a small amount of lime, which comprises adding lime to the diffusion juice in increments at intervals of at least one minute to form a precipitate of impurities, stirring said diffusion juice during formation of said precipitate at a rate below that at which the precipitate breaks up because of turbulence, continuing the addition of lime until between about 0.2 and 0.6 percent by weight CaO has been added based on the weight of beets diffused, and a large flocculent precipitate composed principally of particles of flocculent larger than ¼ inch in cloudy diffusion juice is transformed into smaller more granular curds of precipitated impurities less than $\frac{1}{16}$ of an inch in clear diffusion juice, heating the diffusion juice to a temperature below the boiling point of the juice, filtering said diffusion juice prior to substantial introduction of carbon dioxide into said juice in order to separate the precipitated impurities from the diffusion juice, adding additional lime to the filtrate of said diffusion juice in an amount less than 1.5% by weight CaO based on the weight of beets diffused, subjecting the limed filtrate from the diffusion juice to carbon dioxide gas in order to precipitate additional impurities, and separating the limed diffusion juice filtrate from the precipitate formed by the additional lime and the carbon dioxide gas.

4. The method of removing impurities from an aqueous sugar bearing beet diffusion juice obtained by the treatment of beets with hot water substantially free of added $SO_2$ and at a temperature sufficient to inhibit micro-biological action and to kill living matter in the beet cells which comprises adding as a precipitant only lime to said juice stepwise in increments at intervals while said juice is maintained at a temperature below about 70° C., continuing addition of said lime until between about 0.2 and 0.6 percent by weight CaO has been added based on the weight of beets diffused, and a precipitate of impurities is formed at a pH between about 10.8 and 11.6 which provides a maximum filtration rate, gently stirring said diffusion juice during addition of said lime without causing turbulence in said juice and at a rate below that at which the precipitate breaks up, heating said diffusion juice to a temperature between about 70° C. and 90° C., filtering said diffusion juice while it remains at a temperature between about 70° C. and 90° C. in order to separate the precipitated impurities from the diffusion juice prior to introduction of gaseous oxides into said juice, adding additional lime to said filtered diffusion juice, then subjecting the filtrate from the filtered juice to carbon dioxide gas to precipitate additional impurities, and separating the diffusion juice from the precipitate formed upon subjecting the filtrate to carbon dioxide gas.

5. In the removal of impurities from an aqueous sugar bearing beet diffusion juice obtained by the treatment of beets with hot water substantially free of added $SO_2$ and at a temperature sufficient to inhibit micro-biological action and to kill living matter in the beet cells, the method of pretreating said juice prior to final purification which comprises adding lime to said sugar bearing beet juice in increments at intervals until the total amount of lime added is between about 0.2 and 0.6 percent by weight CaO based on the weight of beets diffused, and a precipitate of curds of impurities having a substantially maximum rate of filtration is formed in a clear juice, gently stirring said diffusion juice during formation of said precipitate at a rate below that which causes the precipitate to disintegrate, and separating the precipitate of impurities from said juice by filtration prior to substantial introduction of carbon dioxide into said juice for further purification.

6. In the removal of impurities from an aqueous sugar bearing beet diffusion juice obtained by the treatment of beets with hot water substantially free of added $SO_2$ and at a temperature sufficient to inhibit micro-biological action and to kill living matter in the beet cells, the method of pretreating said juice prior to final purification which comprises adding lime to said sugar bearing juice in increments at intervals of at least one minute until said juice turns from a turbid solution to a relatively clear solution containing a precipitate of impurities, continuing to add lime in small increments to portions of said juice, measuring the filtration rate of said portions containing said added small increments of lime until the filtration rate reaches a maximum and commences to decrease, adding lime to the main body of said sugar bearing juice at intervals until the total amount of lime added is between about 0.2 and 0.6 percent by weight based on the weight of beets diffused and the amount of lime is that which provides a substantially maximum filtration rate, and separating the precipitate of impurities from said juice by filtration prior to substantial introduction of carbon dioxide into said juice, said diffusion juice being gently stirred during formation of said precipitate at a rate below that which causes the precipitate to break up.

References Cited in the file of this patent

UNITED STATES PATENTS

| Number | Name | Date |
|---|---|---|
| 240,879 | Behr et al. | May 3, 1881 |
| 1,233,919 | Rogan | July 17, 1917 |
| 1,573,733 | Morse | Feb. 16, 1926 |
| 1,752,781 | Bull | Apr. 1, 1930 |
| 1,922,411 | Zitkowski | Aug. 15, 1933 |
| 1,956,741 | Hornberger | May 1, 1934 |
| 2,007,424 | De Dek | July 9, 1935 |
| 2,016,609 | Meredith et al. | Oct. 8, 1935 |
| 2,071,776 | Teatini | Feb. 23, 1937 |
| 2,164,186 | Brown et al. | June 27, 1939 |
| 2,377,634 | Kidd | June 5, 1945 |
| 2,547,298 | Wiklund | Apr. 3, 1951 |
| 2,760,888 | Bonath | Aug. 28, 1956 |
| 2,917,417 | Waterman | Dec. 18, 1959 |

OTHER REFERENCES

McGinnis: Beet-Sugar Technology, 1951, pp. 198–201.

UNITED STATES PATENT OFFICE
CERTIFICATION OF CORRECTION

Patent No. 2,976,189            March 21, 1961

Paul W. Alston

It is hereby certified that error appears in the above numbered patent requiring correction and that the said Letters Patent should read as corrected below.

Column 10, line 17, for "motor 53" read -- motor 52 --; line 61, for "filter", second occurrence, read -- filtrate --; column 11, lines 44 to 46 should appear as shown below instead of as in the patent:

Soluble solids----------------14.5° Brix.
    Purity------------------------84.1%.
    pH---------------------------- 6.7.

column 14, line 3, after "purified" insert -- by --.

Signed and sealed this 29th day of August 1961

(SEAL)
Attest:

ERNEST W. SWIDER
Attesting Officer

DAVID L. LADD
Commissioner of Patents